3,502,461
METHOD OF REDUCING OXIDIC RAW MATERIALS
Helmut Güttler and Joachim Müller-Berghaus, Dusseldorf, Germany, assignors to Gesellschaft fur Elektrometallurgie m.b.H., Dusseldorf, Germany
No Drawing. Filed Dec. 10, 1965, Ser. No. 513,122
Claims priority, application Germany, Dec. 10, 1964,
G 42,235
Int. Cl. C22d 7/02, 7/04, 9/06
U.S. Cl. 75—10                9 Claims

ABSTRACT OF THE DISCLOSURE

There is disclosed a process in which a partial reduction of metal oxides to metal or metal carbide is performed in the solid state in a first stage with carbon and/or reducing gas and a final reduction in the liquid state is performed in a second stage which comprises reducing to metal those oxides which had not yet been completely reduced in the first stage, using a metallothermal or electrometallothermal smelting process in the said second stage.

---

This invention relates to a method of reducing oxidic materials of metals such as chromium, manganese, titanium, vanadium, nickel, iron, tantalum, niobium, molybdenum and tungsten, either individually or in admixture. By oxidic materials is meant any substance containing one or more of the stated metals in the form of an oxide, irrespective whether the said oxides are oxides which occur naturally in ores, or whether they have been produced by physical, chemical or metallurgical processes.

It is known that oxidic ores can be reduced in the solid state with carbon or with reducing gases. The aim of these processes is to reduce the ores as completely as possible. When the oxides are present only in small residual proportions, the oxygen may be removed by means of hydrogen. It has also been proposed first to perform a preliminary reduction in which the ore in the solid state is exposed to the effect of carbon, the reduction then being continued in a smelting furnace with carbonaceous agents until the reduction is complete.

Another known method of reduction is metallothermal or electro-metallothermal reduction. By this process, ferrochrome, for instance, is recovered in an electric furnace from a chromium ore and lime mixture with the addition of silicocrome as a reducing agent.

It has hitherto been impossible to produce alloys with defined and controllable carbon contents ranging from trace amounts up to below the saturation point for carbon, from difficulty reducible oxidic raw materials which in the solid state can be reduced with carbon only to a limited extent. The carbon content of the reduced product must be accepted as it is, and further, carbides of the metals usually form. If lower carbon contents are desired, the alloys thus produced must be decarburised by removing the carbon constituent with solid oxide or oxygen gas. Such processes are expensive and lead to the desired result only with difficultly since during the removal of the carbon, a substantial proportion of the metal is apt to be reoxidised.

The invention seeks to eliminate these disadvantages by a combination process in which a partial reduction of the oxides to metal or metal carbide is performed in the solid state in a first stage with carbon and/or reducing gas and a final reduction in the liquid state is performed in a second stage which comprises reducing to metal those oxides which had not yet been completely reduced in the first stage, using a metallothermal or electrometallothermal smelting process in the said second stage.

For the first stage reduction, the carbon may comprise any industrial carbonaceous material, such as coal, coke and wood. Coal which is either rich in gas, or which has a low content of volatile components, can be used. In principle every type of coke is suitable, but the cokes that have been produced at low temperatures and which usually have a higher surface activity are preferred. Gases which may be used for the first stage reduction include hydrogen, methane and other higher gaseous hydrocarbons or mixtures, thereof such as for example town gas and natural gas.

The method of the invention permits the carbon content of the final product to be controlled by (a) limiting the quantity of raw material reduced in the first stage (which may partly result in the formation of carbides) by controlling the quantity of the reducing agent in the first stage, and/or (b) in the second and metallothermal reduction stage, the carbon content of the metalliferous reducing agent may be so adjusted that a metal is produced which contains a predetermined amount of carbon. Thus carbon content obtained in the first and in the second stages provides the predetermined carbon content of the final product. For instance to a final carbon content controlled in the range 0.01 and 7%.

The reduction with solid carbon in the first stage can be promoted by the application of vacuum, whereby the temperature of reduction is reduced. The temperatures that would otherwise be required at normal pressures may be between 1000 and 1600° C. and even higher, according to the metal that is to be recovered, and are very much lower when using a vacuum. Another advantage of using a vacuum is that it permits the use of smaller amounts of carbon for obtaining a given degree of metallisation, whilst simultaneously preventing reoxidation. In a vacuum the reaction can be allowed to proceed until the free carbon has been completely used up. It has surprisingly been found that by proceeding in this way very low carbon contents down to substantially zero can be achieved.

It is possible to control the carbon content of the final metal or alloy by controlling the degree of metallisation and hence the proportion of metal oxide that is reduced, in the solid state, to between 15 and 80%, preferably between 25 and 65%, of the original oxide content. On the other hand, at a given degree of metallisation and a given carbon content in the metal formed during the first stage, different carbon contents in the final product can be achieved by suitably selecting the carbon content of the metallic reducing agent, for example silicomanganese by silichrome, in the second stage.

The manner and form in which the carbon for the solid state first stage reduction is introduced may be chosen to suit technological needs. When working fine ores, prepared pellets, briquettes, sinter or even lumpy oxidic raw materials for the solid state reduction, the reducing carbon may be loosely admixed with the charge. Alternatively the carbon may be incorporated in the pellets or briquettes.

If reducing gases are used, care must be taken to see that the passage of the gas through the charge that is to be reduced is uniform. This is achieved by using a particulate raw material, pellets or briquettes, porous shapes being preferred.

The furnaces that can be used include rotary tube furnaces, but when using a raw material that is naturally lumpy or that has been transformed into a lumpy state, shaft furnaces are also suitable, provided that the required reducing atmosphere can be maintained. Whereas the aforesaid types of furnace are primarily applicable to processing at normal pressure. When a reduced pressure is used, an electrical resistance heated vacuum furnace is preferably used for the application of the vacuum.

Apart from the possibility of accelerating the reduction in the first stage by the application of vacuum, use may be made of addition of reaction accelerators. Known reaction accelerators of such a kind are, for instance, alkali metal and alkaline earth metal compounds.

The metallothermal reduction of the remaining metal oxide content that has not been reduced in the first stage is performed, as above described, in a second stage by liquefying the remaining metal oxides together with the metal that has already been reduced and then completing the reduction by the addition of metallic reducing agents in solid or liquid form. However, the metallic reducing agent may already be added in the first stage together with the carbon, although it will not participate in the reaction in the first stage, but it will automatically become effective in the second stage in the course of liquefaction.

The economics of the method are further improved by collecting the product obtained in the first stage in heat insulated containers and by then introducing it while still hot batchwise into the electric furnace where the second stage is performed. It is preferred that an inert gas atmosphere is maintained in the insulated container.

What is claimed is:

1. A method of reducing oxidic materials of one or more of the metals chromium, titanium, vanadium, nickel, iron, tantalum, niobium, molybdenum and tungsten, which comprises partially reducing the said material in a first stage, the partial reduction being effected in the solid stage with at least one of (a) a carbonaceous reducing agent and (b) a gaseous reducing agent until an oxidic material containing intermediate product is obtained containing a predetermined amount of the (a) metal or (b) alloy that is to be recovered or (c) of the metal carbide of said (a) metal or (b) alloy that is to be recovered, melting the said intermediate product, and reducing the molten intermediate product in a second stage with a metal free from carbon selected from the group consisting of silicon, aluminum, and calcium-silicon in a metallothermal or electrothermal reducing process.

2. A method according to claim 1, in which the oxidic material is reduced in the first stage whereby the residual oxide content of the said intermediate product is between 15 and 80%.

3. A method according to claim 2, in which the oxidic material content of the said intermediate product is between 25 and 65%.

4. A method according to claim 1, in which the oxidic material in the first stage is in a particulate form consisting of pellets, briquettes, and fine ore.

5. A method according to claim 1, in which the oxidic material is reduced in the said first stage continuously in a rotary tube furnace.

6. A method according to claim 1, in which the oxidic material is reduced in the said first stage continuously in a shaft furnace.

7. A method according to claim 1, in which the oxidic reduction is carried out under reduced pressure in a furnace containing heat radiating elements.

8. A method according to claim 1, in which the said intermediate product from the first stage is transferred while still hot into a smelting furnace and melted therein for the metallothermal reduction in the second stage.

9. A method according to claim 8, in which the intermediate product is transferred to the said smelting furnace under an inert atmosphere.

References Cited

UNITED STATES PATENTS

| | | | |
|---|---|---|---|
| 2,780,537 | 2/1957 | Stelling et al. | 75—33 X |
| 3,138,451 | 6/1964 | Gerlach | 75—33 |
| 2,462,900 | 3/1949 | Riott | 75—33 |
| 2,806,779 | 9/1957 | Case | 75—33 |
| 3,093,474 | 6/1963 | Collin | 75—10 XR |

L. DEWAYNE RUTLEDGE, Primary Examiner

J. E. LEGRU, Assistant Examiner

U.S. Cl. X.R.

75—11, 40